United States Patent
Winter

(10) Patent No.: US 10,902,282 B2
(45) Date of Patent: Jan. 26, 2021

(54) SYSTEM AND METHOD FOR PROCESSING IMAGE DATA

(71) Applicant: Placemeter Inc., New York, NY (US)

(72) Inventor: Alexandre Winter, New York, NY (US)

(73) Assignee: Placemeter Inc., New York, NY (US)

( * ) Notice: Subject to any disclaimer, the term of this patent is extended or adjusted under 35 U.S.C. 154(b) by 26 days.

(21) Appl. No.: 15/912,561

(22) Filed: Mar. 5, 2018

(65) Prior Publication Data
US 2018/0260659 A1 Sep. 13, 2018

Related U.S. Application Data

(60) Continuation of application No. 14/924,142, filed on Oct. 27, 2015, now Pat. No. 9,911,065, which is a (Continued)

(51) Int. Cl.
*G06K 9/62* (2006.01)
*G06K 9/00* (2006.01)
(Continued)

(52) U.S. Cl.
CPC ............ *G06K 9/6215* (2013.01); *G06F 11/00* (2013.01); *G06F 11/34* (2013.01);
(Continued)

(58) Field of Classification Search
CPC .. G06K 9/6215; G06K 9/00758; G06F 11/34; G06F 17/30943; G06T 7/20; G06T 11/206
See application file for complete search history.

(56) References Cited

U.S. PATENT DOCUMENTS

| 5,194,908 A | 3/1993 | Lougheed |
| 6,295,321 B1 | 9/2001 | Lyu |

(Continued)

FOREIGN PATENT DOCUMENTS

| CN | 101489121 A | 7/2009 |
| WO | 2015/184440 A2 | 12/2015 |

OTHER PUBLICATIONS

Machado, D., "People Counting System Using Existing Surveillance Video Camera" Nov. 2011, pp. 1-71.
(Continued)

*Primary Examiner* — David F Dunphy
(74) *Attorney, Agent, or Firm* — Boyle Fredrickson, SC

(57) ABSTRACT

The PLACEMETER PLATFORM APPARATUSES, METHODS AND SYSTEMS ("PM-PLATFORM") transform sensor data and/or feedback via PMPLATFORM components into notifications, updates, coupons, promotions, transactions and/or activities notifications, updates, coupons, promotions, transactions and/or activities. In one implementation, the PM-PLATFORM comprises a sensor, a memory, and a processor disposed in communication with the sensor and memory, the memory storing processor-issuable instructions to receive raw environment data at a sensor for at least two discrete points in time, analyze the received raw environment data locally to determine an at least one occupancy metric, store the occupancy metric, receive further raw environment data for a further point in time, process the further raw environment data to determine a further occupancy metric, compare the further occupancy metric to at least one previous occupancy metric, and issue a notification based on the comparison.

20 Claims, 6 Drawing Sheets

Related U.S. Application Data division of application No. 14/031,998, filed on Sep. 19, 2013, now Pat. No. 9,213,781.

(60) Provisional application No. 61/702,764, filed on Sep. 19, 2012.

(51) Int. Cl.

| | | |
|---|---|---|
| *G06T 7/20* | (2017.01) | |
| *G06T 11/20* | (2006.01) | |
| *G06F 16/90* | (2019.01) | |
| *G06F 11/34* | (2006.01) | |
| *G06F 11/00* | (2006.01) | |
| *G06F 11/30* | (2006.01) | |

(52) U.S. Cl.
CPC .......... *G06F 11/3476* (2013.01); *G06F 16/90* (2019.01); *G06K 9/00758* (2013.01); *G06T 7/20* (2013.01); *G06T 11/206* (2013.01); *G06F 11/3058* (2013.01); *G06F 11/3409* (2013.01)

(56) References Cited

U.S. PATENT DOCUMENTS

| | | | |
|---|---|---|---|
| 6,587,574 B1 | 7/2003 | Jeannin | |
| 6,987,883 B2 | 1/2006 | Lipton et al. | |
| 6,999,600 B2 | 2/2006 | Venetianer et al. | |
| 7,006,128 B2 | 2/2006 | Xie | |
| 7,199,798 B1 | 4/2007 | Echigo | |
| 7,221,367 B2 | 5/2007 | Cardno | |
| 7,224,852 B2 | 5/2007 | Lipton et al. | |
| 7,382,244 B1 | 6/2008 | Donovan | |
| 7,391,907 B1 | 6/2008 | Venetianer et al. | |
| 7,424,175 B2 | 9/2008 | Lipton et al. | |
| 7,574,043 B2 | 8/2009 | Porkili | |
| 7,613,322 B2 | 11/2009 | Yin et al. | |
| 7,688,349 B2 | 3/2010 | Flickner et al. | |
| 7,796,780 B2 | 9/2010 | Lipton et al. | |
| 7,801,330 B2 | 9/2010 | Zhang et al. | |
| 7,868,912 B2 | 1/2011 | Venetianer et al. | |
| 7,932,923 B2 | 4/2011 | Lipton et al. | |
| 8,325,036 B1 | 12/2012 | Fuhr | |
| 8,331,619 B2 | 12/2012 | Ikenoue | |
| 8,340,349 B2 | 12/2012 | Salgian | |
| 8,340,654 B2 | 12/2012 | Bratton et al. | |
| 8,369,399 B2 | 2/2013 | Egnal et al. | |
| 8,401,229 B2 | 3/2013 | Hassan-Shafique et al. | |
| 8,457,401 B2 | 6/2013 | Lipton et al. | |
| 8,526,678 B2 | 9/2013 | Liu et al. | |
| 8,564,661 B2 | 10/2013 | Lipton et al. | |
| 8,582,803 B2 | 11/2013 | Ding | |
| 8,594,482 B2 | 11/2013 | Fan | |
| 8,599,266 B2 | 12/2013 | Trivedi | |
| 8,625,905 B2 | 1/2014 | Schmidt | |
| 8,649,594 B1 | 2/2014 | Hua | |
| 8,654,197 B2 | 2/2014 | Nizko | |
| 8,655,016 B2 | 2/2014 | Brown | |
| 8,711,217 B2 | 4/2014 | Venetianer et al. | |
| 8,823,804 B2 | 9/2014 | Haering et al. | |
| 8,948,458 B2 | 2/2015 | Hassan-Shafique et al. | |
| 9,213,781 B1 | 12/2015 | Winter | |
| 2002/0051057 A1 | 5/2002 | Yata | |
| 2002/0124263 A1 | 9/2002 | Yokomizo | |
| 2003/0053692 A1 | 3/2003 | Hong | |
| 2003/0090751 A1 | 5/2003 | Itokawa | |
| 2003/0215110 A1 | 11/2003 | Rhoads | |
| 2004/0022227 A1 | 2/2004 | Lynch | |
| 2004/0151342 A1 | 8/2004 | Venetianer | |
| 2004/0161133 A1 | 8/2004 | Elazar | |
| 2005/0169531 A1 | 8/2005 | Fan | |
| 2005/0185058 A1 | 8/2005 | Sablak | |
| 2005/0213836 A1 | 9/2005 | Hamilton | |
| 2006/0007308 A1 | 1/2006 | Ide | |
| 2006/0031291 A1 | 2/2006 | Beckemeyer | |
| 2006/0078047 A1 | 4/2006 | Shu | |
| 2006/0095539 A1 | 5/2006 | Renkis | |
| 2006/0198608 A1 | 9/2006 | Girardi | |
| 2006/0227862 A1* | 10/2006 | Campbell .......... G06K 9/00778 |
| | | | 375/240 |
| 2006/0233535 A1 | 10/2006 | Honda | |
| 2006/0290779 A1 | 12/2006 | Reverte | |
| 2007/0024705 A1 | 2/2007 | Richter | |
| 2007/0024706 A1 | 2/2007 | Brannon | |
| 2007/0071403 A1 | 3/2007 | Urita | |
| 2007/0016345 A1 | 5/2007 | Peterson | |
| 2007/0127508 A1 | 6/2007 | Bahr | |
| 2007/0127774 A1 | 6/2007 | Zhang | |
| 2007/0147690 A1 | 6/2007 | Ishiwata | |
| 2007/0177792 A1 | 8/2007 | Ma | |
| 2008/0030429 A1 | 2/2008 | Hailpern | |
| 2008/0123955 A1 | 5/2008 | Yeh | |
| 2008/0137950 A1 | 6/2008 | Park | |
| 2008/0152122 A1 | 6/2008 | Idan | |
| 2008/0263012 A1 | 10/2008 | Jones | |
| 2008/0281518 A1 | 11/2008 | Dozier | |
| 2008/0316327 A1 | 12/2008 | Steinberg | |
| 2008/0316328 A1 | 12/2008 | Steinberg | |
| 2009/0033745 A1* | 2/2009 | Yeredor ................. G01S 3/7864 |
| | | | 348/152 |
| 2009/0034846 A1* | 2/2009 | Senior ................. G06K 9/00778 |
| | | | 382/190 |
| 2009/0063205 A1 | 3/2009 | Shibasaki | |
| 2009/0080864 A1 | 3/2009 | Rajakarunanayake | |
| 2009/0103812 A1 | 4/2009 | Diggins | |
| 2009/0141939 A1 | 6/2009 | Chambers | |
| 2009/0147991 A1 | 6/2009 | Chau | |
| 2009/0222388 A1* | 9/2009 | Hua .......................... G06N 5/02 |
| | | | 706/12 |
| 2009/0268968 A1 | 10/2009 | Milov | |
| 2009/0290023 A1 | 11/2009 | Lefort | |
| 2010/0014717 A1 | 1/2010 | Rosenkrantz | |
| 2010/0142927 A1 | 6/2010 | Lim | |
| 2010/0177194 A1 | 7/2010 | Huang | |
| 2010/0211304 A1 | 8/2010 | Hwang | |
| 2010/0260385 A1 | 10/2010 | Chau | |
| 2010/0290710 A1 | 11/2010 | Gagvani | |
| 2010/0295999 A1 | 11/2010 | Li | |
| 2010/0302346 A1 | 12/2010 | Huang | |
| 2011/0007944 A1* | 1/2011 | Atrazhev ............ G06K 9/00778 |
| | | | 382/103 |
| 2011/0018998 A1 | 1/2011 | Guzik | |
| 2011/0125593 A1 | 5/2011 | Wright | |
| 2011/0130905 A1 | 6/2011 | Mayer | |
| 2011/0141227 A1 | 6/2011 | Bigioi | |
| 2011/0152645 A1 | 6/2011 | Hoover | |
| 2011/0153645 A1 | 6/2011 | Hoover | |
| 2011/0184307 A1 | 7/2011 | Hulin | |
| 2011/0280547 A1 | 11/2011 | Fan | |
| 2011/0310970 A1* | 12/2011 | Lee ....................... H04N 19/51 |
| | | | 375/240.16 |
| 2012/0008819 A1 | 1/2012 | Ding | |
| 2012/0057640 A1 | 3/2012 | Shi | |
| 2012/0075450 A1 | 3/2012 | Ding | |
| 2012/0086568 A1 | 4/2012 | Scott | |
| 2012/0106782 A1 | 5/2012 | Nathan | |
| 2012/0127262 A1 | 5/2012 | Wu | |
| 2012/0134535 A1 | 5/2012 | Pai | |
| 2012/0179832 A1 | 7/2012 | Dolph | |
| 2012/0182392 A1 | 7/2012 | Kearns | |
| 2012/0262583 A1 | 10/2012 | Bernal | |
| 2012/0304805 A1 | 11/2012 | Kim | |
| 2013/0058537 A1 | 3/2013 | Chertok | |
| 2013/0086389 A1 | 4/2013 | Suwald | |
| 2013/0148848 A1 | 6/2013 | Lee | |
| 2013/0166711 A1 | 6/2013 | Wang | |
| 2013/0202165 A1 | 8/2013 | Wehnes | |
| 2013/0251216 A1 | 9/2013 | Smowton | |
| 2014/0003708 A1 | 1/2014 | Datta | |
| 2014/0015846 A1 | 1/2014 | Campbell | |
| 2014/0036090 A1 | 2/2014 | Black | |
| 2014/0046588 A1 | 2/2014 | Maezawa | |
| 2014/0052640 A1 | 2/2014 | Pitroda | |
| 2014/0129596 A1 | 5/2014 | Howe | |
| 2014/0132728 A1 | 5/2014 | Verano | |

(56) References Cited

U.S. PATENT DOCUMENTS

| | | |
|---|---|---|
| 2014/0212002 A1 | 7/2014 | Curcio |
| 2014/0278068 A1 | 9/2014 | Stompolos |
| 2014/0294078 A1 | 10/2014 | Seregin |
| 2014/0307056 A1 | 10/2014 | Collet |
| 2014/0359576 A1 | 12/2014 | Rath |
| 2015/0006263 A1 | 1/2015 | Heier |
| 2015/0046127 A1 | 2/2015 | Chen |
| 2015/0070506 A1 | 3/2015 | Chattapadhyay |
| 2015/0077218 A1 | 3/2015 | Chakkaew |
| 2015/0138332 A1 | 5/2015 | Cheng |
| 2015/0227774 A1 | 8/2015 | Balch |
| 2015/0339532 A1 | 11/2015 | Sharma |
| 2015/0348398 A1 | 12/2015 | Williamson |
| 2015/0350608 A1 | 12/2015 | Winter |
| 2016/0012465 A1 | 1/2016 | Sharp |
| 2016/0019427 A1 | 1/2016 | Martin |
| 2016/0088222 A1 | 3/2016 | Jenny |
| 2016/0314353 A1 | 10/2016 | Winter |
| 2016/0334927 A1 | 11/2016 | Kim |
| 2017/0068858 A1 | 3/2017 | Winter |
| 2017/0070707 A1 | 3/2017 | Winter |
| 2017/0277956 A1 | 9/2017 | Winter |
| 2017/0277959 A1 | 9/2017 | Winter |
| 2018/0046315 A1 | 2/2018 | Kim |
| 2018/0165813 A1 | 6/2018 | Mai |

OTHER PUBLICATIONS

Lefloch, D., "Real-Time People Counting System Using Video Camera" Master of Computer Science, Image and Artificial Intelligence 2007 at UFR Sciences et Technique, pp. 1-5.

Terada, K., "A Method of Counting the Passing People by Using the Stereo Images" Image Processing, 1999, ICIP 99. Proceedings. 1999 International Confenerence, pp. 1-5.

Bannour, H., et al., "Survey of the Adequate Descriptor for Content-Based Image Retrieval on the Web" Global versus Local Features, Department of Information Sciences.

Lisin, D. et al., "Combining Local and Global Image Features for Object Class Recognition" Computer Vision Lab, Department of Computer Science, University of Massachusetts.

Paninski, L., " Estimation of Entropy and Mutual Information" Center for Neural Science, New York University, New York, NY 10003, USA, Received Jun. 3, 2002; Accepted Nov. 27, 2002.

Makris et al., "Learning Semantic Scene Models From Observing Activity in Visual Surveillance" Jun. 2005, IEEE, Trans. on Systems, Man, and Cybernetics—part B: Cybernetics, vol. 35, No. 3, p. 397-408.

Estevez-Ayres et al., "Using Android Smartphones in a Service-Oriented Video Surveillance System", Jan. 2011, IEEE Int. Conf. on Consumer Electronics, 2011, p. 887-888.

Parameswaran et al., "Design and Validation of a System for People Queue Statistics Estimation", Jan. 2012, Springer, Video Analytics for Business Intelligence, ;. 355-373.

Foresti et al., "Event Classification for Automatic Visual-Based Surveillance of Parking Lots", Aug. 2004, IEEE, Proceedings of the 17th Int. Conf. on Pattern Recognition, p. 1-4.

Yang et al., "Multi-Target Tracking by Online Learning of Non-Linear Motion Patterns and Robust Appearance Models", Jun. 2012, IEEE, 2012 IEEE Conf. on Computer Vision and Pattern Recognition, p. 1918-1925.

Magee, "Tracking Multiple Vehicle Using Foreground, Background and Motion Models", Feb. 2004, Elsevier, Image and Vision Computing, vol. 22, issue 2, p. 143-155.

Morris et al., "A Survey of Vision-Based Trajectory Learning and Analysis for Surveillance", Aug. 2008, IEEE, IEEE Transactions on Circuits and Systems for Video Technology, vol. 18, No. 8, p. 1114-1127.

Stauffer et al., "Adaptive Background Mixture Models for Real-Time Tracking", Jun. 1999, IEEE, 1999 IEEE Computer Society Conference on Computer Vision and Pattern Recognition Proceedings, p. 246-252.

Xu et al., "Partial Observation vs. Blind Tracking through Occlusion", Jan. 2003, British Machine Vision Conference (BMVC 2002), p. 777-786.

Virtual Turnstile | Security Systems Technology | www.sstgroup.co.uk/solutions/access-control/virtual-turnstile pp. 1-2.

Amended Claims of Related U.S. Appl. No. 15/288,085, filed Jun. 13, 2018, retrieved from USPTO Public PAIR.

Amended Claims of Related U.S. Appl. No. 15/288,224, filed May 9, 2018, retrieved from USPTO Public PAIR.

Placemeter Inc., PCT/US2015/033499 Application, "Notification of Transmittal of the International Search Report and the Written Opinion", dated Oct. 28, 2015.

Placemeter Inc., PCT/US2016/025816 Application, "Notification Concerning Transmittal of International Preliminary Report on Patentability", dated Nov. 2, 2017.

Placemeter Inc., PCT/US2016/025816 Application, "Notification of Transmittal of the International Search Report and the Written Opinion", dated Jul. 11, 201.

Placemeter Inc., PCT/US2016/028511 Application, "Notification Concerning Transmittal of International Preliminary Report on Patentability", dated Nov. 2, 2017.

Placemeter Inc., PCT/US2016/028511 Application, "Notification of Transmittal of the International Search Report and the Written Opinion", dated Sep.14, 2016.

Placemeter Inc., EP 15798996.3 Application, "Communication Pursuant to Rule 164(1) EPC—Partial Supplementary European Search Report", dated Nov. 27, 2017.

Placemeter Inc., EP 15798996.3 Application, "Communication—Extended European Search Report", dated Feb. 6, 2018.

Baudrier, E., et al., "A Fast Binary-Image Comparison Method with Local-Dissimilarity Quantification", Laboratory Crestic, Troyes Cedex, France.

Almomani, R., et al., "Segtrack: A Novel Tracking System with Improved Object Segmentation", IEEE 2013, Wayne State University, Department of Computer Science, Detroit, MI 48202, ICIP 2013, p. 3939-3943.

Lucas, B., et al., "An Iterative Image Registration Technique with an Application to Stereo Vision", Proceedings of Imaging Understanding Workshop 1981, Computer Science Department, Carnegie-Mellon University, p. 121-130.

Russakoff, D., et al., "Image Similarity Using Mutual Information of Regions", Dept. Of Computer Science, Stanford University, ECCV 2004, LNCS 3023, Springer-Verlag, Berlin Heidelberg 2004, pp. 596-607.

Shi, J., et al., "Good Features to Track", IEEE Conference on Computer Vision and Pattern Recognition (CVPR94), Seattle, Jun. 1994,.

Studholme, C., et al., "An Overlap Invariant Entropy Measure of 3D Medical Image Alignment", 1999 Pattern Recognition Society, Published by Elsevier Sciences Ltd., Pattern Recognition 31 (1999), p. 71-86.

Viola, P., et al., "Robuts Real-Time Face Detection", 2004 International Journal of Computer Vision 57(2), Kluwer Academic Publishers, Netherlands, p. 137-154.

"Virtual Turnstile" Security Systems Technology Ltd 2008 pp. 1-2.

Borges, "Pedestrian Detection Based on Blob Motion Statistics", Feb. 2013, IEEE, IEEE Trans. on Circuits and Systems for Video Technology, vol. 23, No. 2, pp. 224-235 (Year 2013).

Miller, "Supervised Learning and Bayesian Classification", Sep. 2011, University of Massachusetts Amherst, CS370; Introduction of Computer Vision (<https://people.cs.umass.edu/~elm/Teaching/370_S11/>), <https://people.cs.umass.edu/~elm/Teaching/Docs/supervised.pdf> , p. 1-8 (Year 2011).

Franconeri et al., "A simple proximity heuristic allows tracking of multiple objects through occlusion", Jan 2012, Psychonomic Society, Attention, Perception & Psychophysics, vol. 74, issue 4, pp. 691-702 (Year 2012).

Stephen et al., "A visual tracking system for the measurement of dynamic structural displacements", Aug. 1991, Wiley, Concurrency and Computation: Practice and Experience, vol. 3, issue 4, pp. 357-366 (Year 1991).

* cited by examiner

Example: Backend Data Model

Example: Interface/Display Elements

SYSTEM AND METHOD FOR PROCESSING IMAGE DATA

CROSS REFERENCE TO RELATED APPLICATION

This application claims priority to U.S. Provisional Application No. 61/702,764 filed Sep. 19, 2012, the entire contents of which is hereby incorporated by reference.

This patent for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The patent innovations generally address apparatuses, methods, and systems for activity measurement, and more particularly, include PLACEMETER PLATFORM APPARATUSES, METHODS AND SYSTEMS ("PM-PLATFORM"). In order to develop a reader's understanding of the innovations, disclosures of various inventions and improvements have been compiled into a single description to illustrate and clarify how aspects of these innovations operate independently, interoperate as between individual innovations, and/or cooperate collectively. The application goes on to further describe the interrelations and synergies as between the various innovations.

BRIEF DESCRIPTION OF THE DRAWINGS

The accompanying appendices and/or drawings illustrate various non-limiting, example, inventive aspects in accordance with the present disclosure.

For simplicity and clarity of illustration, elements in the figures are not necessarily to scale.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Placemeter Platform (PM-Platform)

The PLACEMETER PLATFORM APPARATUSES, METHODS AND SYSTEMS (hereinafter "PM-PLATFORM") transform sensor data and/or feedback, via PM-PLATFORM components, into notifications, updates, coupons, promotions, transactions and/or activities. The PM-PLATFORM also provides real-time activity data, analytics and statistics, predictions, alerts, advertisements, business intelligence, and the like to service providers, consumers, venues, and/or the like.

Figure 1:
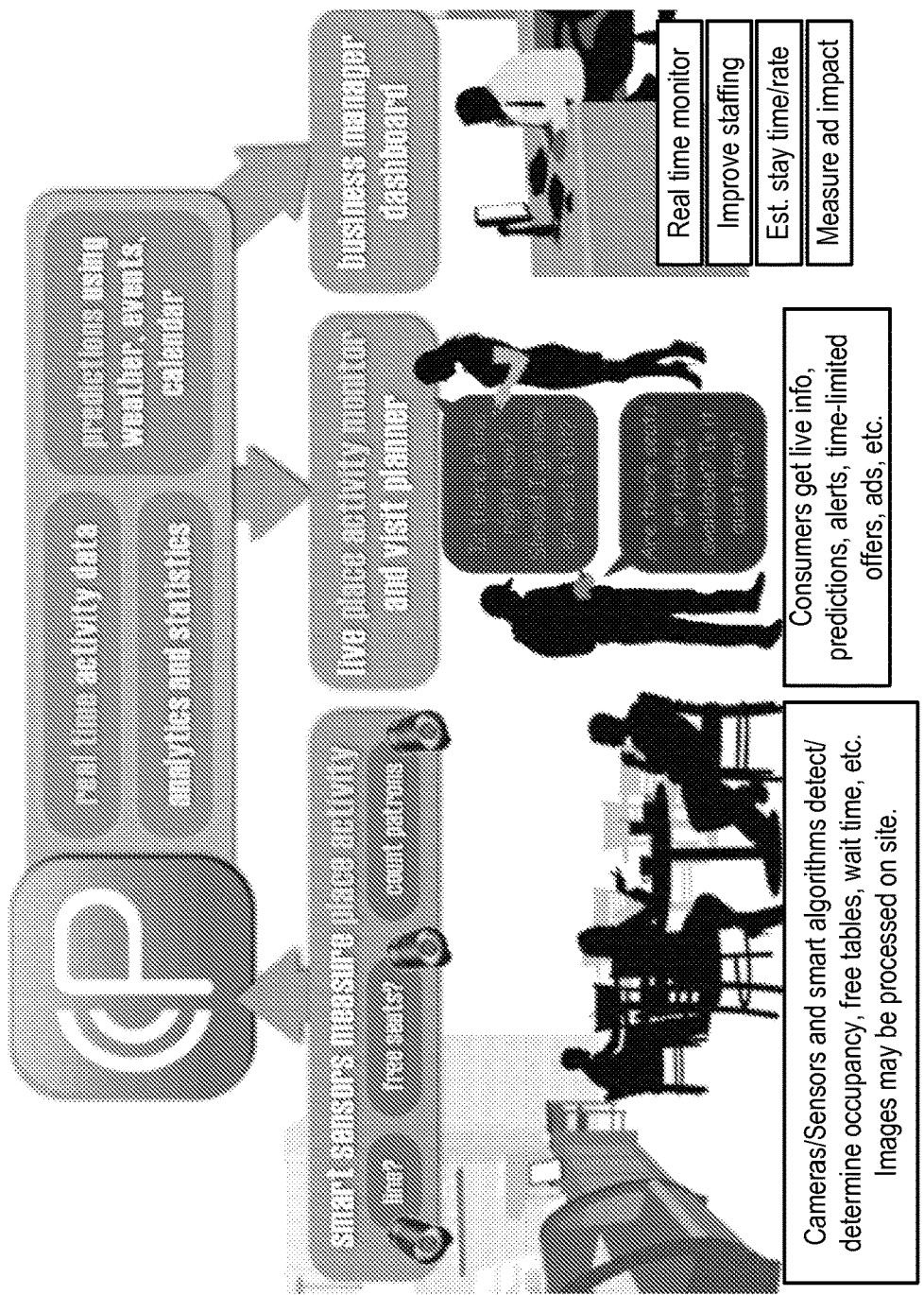
FIG. 1 shows an overview diagram illustrating example aspects of embodiments of the PM-PLATFORM.

In some embodiments, the PM-PLATFORM may utilize optical and/or other physical sensors to identify activity or status information about physical locations/places. Such data/information are hereinafter referred to as "PM metrics". The PM-PLATFORM may utilize processing components/algorithms to determine or compute each PM metric via processing raw input signals. As illustrated in FIG. 1, raw signals may be captured by PM-PLATFORM sensors positioned in a location or a place. Such PM-PLATFORM sensors are configured to gather signals with applicable, rich data such that the PM-PLATFORM can compute PM metrics from raw signals, but compact enough to reduce system processing and networking requirements. The signal may be transported to a computing unit/component in an appropriate format, which may be standardized or that varies for each raw signal type. The processing and communication of the PM-PLATFORM provide lowered processor usage, higher processor efficiency, lowered power requirements, reduced communication bandwidth usage, and improved security.

According to some embodiments, PM metrics and their corresponding raw signals and transport protocols may include, but are not limited to, the following list:

Measure: people traffic in and out of the place.
Signals: vertical video stream on top of each access to the place.
Transmission format: wired or wireless network video streaming—IP camera OR USB drivers if wired.
Measure: wait time at the line.
Signals: vertical video over the line or 45-degree video stream that encompass all the line.
Transmission format: wired or wireless network video streaming—IP camera OR USB drivers if wired.
Measure: temperature
Signals: readings from electronic thermometer.
Transmission format: wired or wireless network video streaming—IP camera OR USB drivers if wired.
Measure: average noise level.
Signals: sound stream from a microphone.
Transmission format: wired or wireless network audio or video streaming—IP camera OR USB drivers if wired OR jack input and raw signal transfer.
Measure: background noise type.
Signals: sound stream from a microphone.
Transmission format: wired or wireless network audio or video streaming—IP camera OR USB drivers if wired OR jack input and raw signal transfer.
Measure: number of tables and chairs available.
Signal: readings of IR diodes positioned under each table or on each chair OR video streams that overlap and cover the whole restaurant area.
Transmission format: RF signal sent by sensor and captured by an RF receiver on the computer side In some embodiments of the PM-PLATFORM, once raw signals for a given sensor get to the computing unit, the PM-PLATFORM may utilize various components to process the input raw signal and determine/compute the corresponding PM metrics. The PM-PLATFORM may utilize one or more processing components, which in some embodiments may be implemented as algorithms and/or sub-algorithms. For example, if the raw signal is a video stream and the measure is people traffic or line wait, the PM-PLATFORM may utilize one or more image/data processing components or bricks, as discussed below in greater detail.

In one embodiment, the PM-PLATFORM may utilize a Global Image Comparison ("GIC") component that enables analysis/comparison of multiple images. For example, the GIC component may analyze two images I1 and I2 globally using a normalized mutual information measure. The two images' gray levels or intensities may be linearly normalized using 5%/95% percentiles over their histograms. Additionally, or alternatively, a histogram equalization component or algorithm may be used. Both the images may then be resized to the same dimensions, typically 16×16 or 32×32, and then the images may be projected onto a color or gray level space with a limited number of values. The color or gray level reduction is performed, for example, using an elegant averaging algorithm. Then the histograms of these values for each image may be determined to estimate the color or gray level probability density functions h1(x) and h2(x). A crossed histograms of values co-occurrence may be determined so as to estimate the joint probability of occurrence of values h12(x, y). Entropy for each image H1 and H2 as well as the joint entropy H12 may be determined/computed, for example, using standard formulas. The mutual information may then be computed as I=H1+H2−H12. The normalized mutual information In is computed as a I/(H1+H2), I/MAX (H1, H2) or I/H12. Selecting the number of gray levels/colors and the resize dimension of the image well facilitates the determination of this normalized mutual information rate well. This rate provides a good measure of the global "common points" of the two images, that is, the higher In is, the closer the two images are. Although some embodiments use 16 for grey level or color values and 32 for the window size, other embodiments may use 8 and 16, respectively, while other values are also appropriate for some implementations.

The PM-PLATFORM may utilize a Local Image Comparison Map ("LICM") component that provides/facilitates drawing a map of the differences between two images at a low resolution. For example, in some embodiments, if necessary, the two original images may be resized into the same frame originally. Such a frame may be, by way of non-limiting example, 256 to 1024 in each dimension. In some implementations, the LICM component may utilize/have two parameters: a width and a height of window over which local normalized mutual information is computed—the processing window. The original image may be split into adjacent or slightly overlapping (e.g., in some embodiments, 25% max) windows the size of the processing window. The normalized MI is determined/computed over each window. A final comparison map image may be generated/created where the dimensions are the number of horizontal and vertical processing windows that are computed on the original images. For example, if a window has an index I and J over the original two images, the value of the normalized MI may be assigned to pixel with coordinates I, J.

Some implementations of the PM-PLATFORM may utilize a Difference Mask (liDMil) component, in which local image comparison maps are computed over a set of M consecutive frames. The values of each pixel of each map may be sorted and stored in an array in increasing order. The percentile P may be defined as, for example, 70%. A "percentile threshold" may be defined as the floot (M*P), and the threshold used to compute a difference map: every pixel with a value less than the threshold will be marked as "1", else "0". Morphological closing and openings may be successively applied to clean the mask. Alternatively, to the unique threshold method, some embodiments may utilize a threshold map method where a threshold is determined/computed for each pixel coordinate of the difference map, thus adapting to images where, for example, there is an occlusion and some parts of the image never change.

Figure 2:
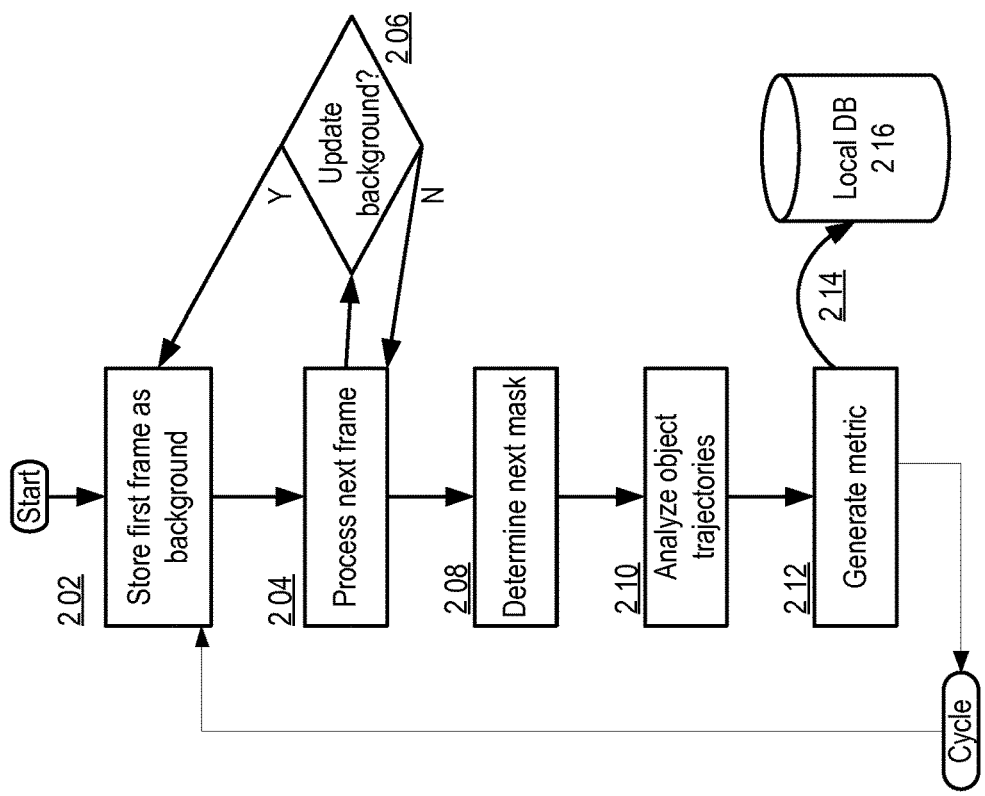
FIG. 2 shows a logic diagram illustrating an example Local Analysis component operation in some embodiments of the PM-PLATFORM.

The PM-PLATFORM may then process the data as shown in FIG. 2, for example, via a Local Analysis ("LA") component. The PM-PLATFORM/LA component may store a first frame 202 (e.g., as a background frame), and the next 23 frame is processed 204. Processing may include updating the background frame, e.g., if a stretch of consecutive frames that are very close to each other consecutively and to a candidate background image has reached or exceeded a given length. In some embodiments, the stretch is long enough if longer than the stretch corresponding to the current background image, or to a specified value. The current mask may be determined/detected as difference map between the current frame and the current background frame. In an alternative implementation, a set of potential background frames may be stored.

The next mask may then be determined 208 by the PM-PLATFORM. In some implementations, when determining the next mask, object-tracks may be defined as consecutive masks representing the same object that moves in a video, with a list of current object tracks kept in memory (either intermittently or at all times). In some embodiments, when a new mask is created, it is first split into connected components, and each connected component is compared to existing objects. If their surface intersects with one of several objects latest masks, and, in some implementations, if the PM-PLATFORM determines these masks are not too old, the current connected component is associated to the object that matches best. In some implementations, if an object has not had added masks for more than a given duration, it is considered as archived. An archived object represents an object's trajectory through the image, and in some embodiments may be associated to close objects or split into several parts when analyzing its three dimensional volume, that is, in some implementations, by stacking up all the masks into a 3D space where time is the $3^{rd}$ dimension.

The PM-PLATFORM may then analyze archived object trajectories 210, for example, to see if they may represent a person coming in and out of a place, or a person making progress within a line. Once this analysis is performed, a metric or measure can be generated/created 212, for example +1 or −1 when the trajectory crossed a predefined or self-estimated threshold when analyzing people traffic, or the time to cross the image along the line path if analyzing line wait time.

In some embodiments, when a new measure is computed or available, it is stored 214 in a local database 216 along with, by way of non-limiting example, a time stamp, an ID of the place it was measured in, an ID of the sensor it originates from and a code to identify the type of PM metric it is. If information, warning or error messages are produced during the processing of the raw signals into PM metrics, they may be stored, for example, in the same database system under a different structure. Each message may be stored with a description, the sensor it comes from, a time stamp, the level of gravity of the message, and/or the like. A daemon component and/or software may then scan the database on a regular basis to look for new messages or PM metric samples. If a message or PM metric is found in the local database, the daemon software will read it from the database, transfer it to PM-PLATFORM backend through a network API call, and if the transfer was successful, remove the message or PM metric from the local database. In some implementations, network API calls may be performed in the REST standard. The API may return error messages or a success message for each call. The transmission of a measure or a message may be done through two different API calls. A detailed description of the interactions between the sensors and the backend (architecture, APIs, etc.), is discussed in greater detail below.

Once a PM metric reaches the PM-PLATFORM backend, it may be stored in a database, and associated with a sensor and a place that were created in the database at setup to represent the place and sensor the PM metric originates from. The place may be described as a name, ID, address and may have a type, e.g., restaurant, public space, take out, cafe, and/or the like. Additional information may be associated with the place, such as the number of staff available at each time of the day, the opening hours of the place, etc. Such additional pieces of information may be used to correct erroneous PM metrics or readings when they occur, for example if the location/place is closed then the occupancy cannot be higher than the number of staff present at that time, or the wait time at the line cannot be other than 0.

Figure 3:
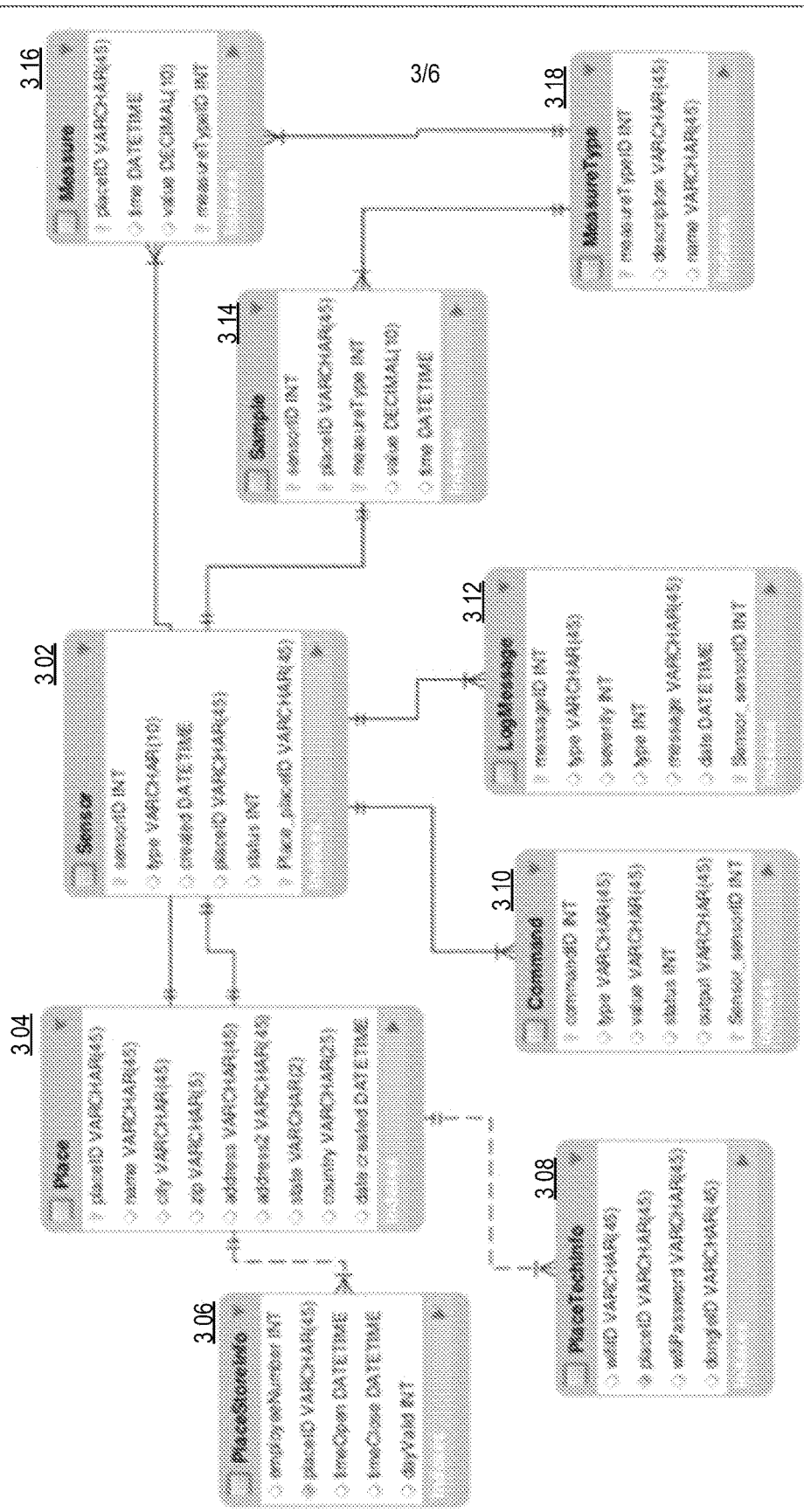
FIG. 3 shows an example backend data diagram for embodiments of the PM-PLATFORM.

FIG. 3 provides an example backend data model for an embodiment of the PM-PLATFORM. Sensor data 302 may include such data as, but not limited to: sensor ID, type, create date, place ID, status, and/or the like, (see discussion of Sensor table 619b). Place data 304 may include information such as, but not limited to: place ID, name, location, city, ZIP, address, address2, state, country, place create date, place status, and/or the like (see discussion of Place table 619c below). Place Store information 306 may include data such as, but not limited to: place store ID, type, employee number, place ID, open, close, day, status, and/or the like (see discussion of Place Store Info table 619d below). Place Tech information 308 may include data such as, but not limited to: place tech ID, type, Wi-Fi, Wi-Fi pw, place ID, dongle ID, status, and/or the like (see discussion of Place Tech Info table 61ge). Command information 310 may include data such as, but not limited to: command ID, type, value, status, output, senor ID, and/or the like (e.g., as discussed with respect to Command table 619f below). Log Message data 312 may include, but is not limited to: log ID, type, severity, 23 type, message, date, place ID, sensor ID, status, and/or the like (see discussion of Log Message table 619g). Sample information 314 may include data such as, but not limited to: sample ID, sensor ID, place ID, measure type, value, time, status, and/or the like (discussed in Sample table 619h below). Measure information 316 may include data such as, but not limited to: measure ID, place ID, time sensor ID, place ID, measure type ID, value, time, status, and/or the like (see Measure table 619i discussion below). Measure Type data 318 may include, but is not limited to: measure type ID, description, name, and/or the like (as discussed in Measure Type table 619j below).

PM metrics may then be analyze/processed/packaged into an "end user view" that summarizes the information enough so that it is easily readable by end users, and so that it does not divulge information the store owner wants to keep private, such as the exact occupancy of his or her place, or the precise wait time at the register. In some embodiments of the PM-PLATFORM, a business manager has the option to agree to release such information to end users through the PM-PLATFORM, although even in that case, the raw measures may still be analyzed so as to be presented in an elegant and summarized way to the user.

Such analyses include but are not limited to color coding the measures. That is, if a measure has values that range from A to B, the PM-PLATFORM represents the measure by N color codes or N levels that correspond to N typical ranges of the value. To do so, the PM-PLATFORM determines PM metrics of the values over a given period of time or number of samples, generally ending at the current or latest sample. In such an embodiment, such a set of metrics or values are referred to as the sample set, having a size is S. In some embodiments, S is a sorted set. The PM-PLATFORM may determine thresholds Ti for which the value is, in general, present between i/N % and (i+1)/N % of the time. If the I is comprised between 0 and N−1. I represents the level or color code index. If i=0, the PM-PLATFORM identifies the value S/N th value in the ordered set S. Each threshold may, in some implementations, be defined as the value at index i*S/N in the sorted set S. Once these values are determined/computed, the color code or level associated with each PM metric may be the index I where the value V is greater than threshold Ti and less than threshold T(i+1). Each index i may be represented by a specific color and logo. These logos and colors are then used to represent the value to the end user in an elegant and intelligible way.

Figure 4:
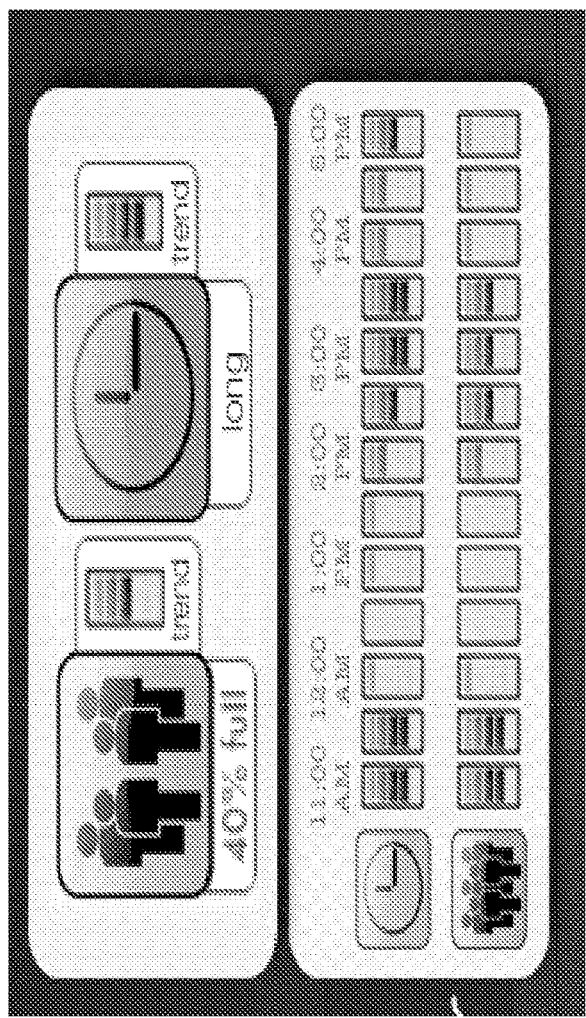
FIGS. 4-5 show example user data/interface/display diagrams illustrating example features of some embodiments of the PM-PLATFORM.
Figure 5:
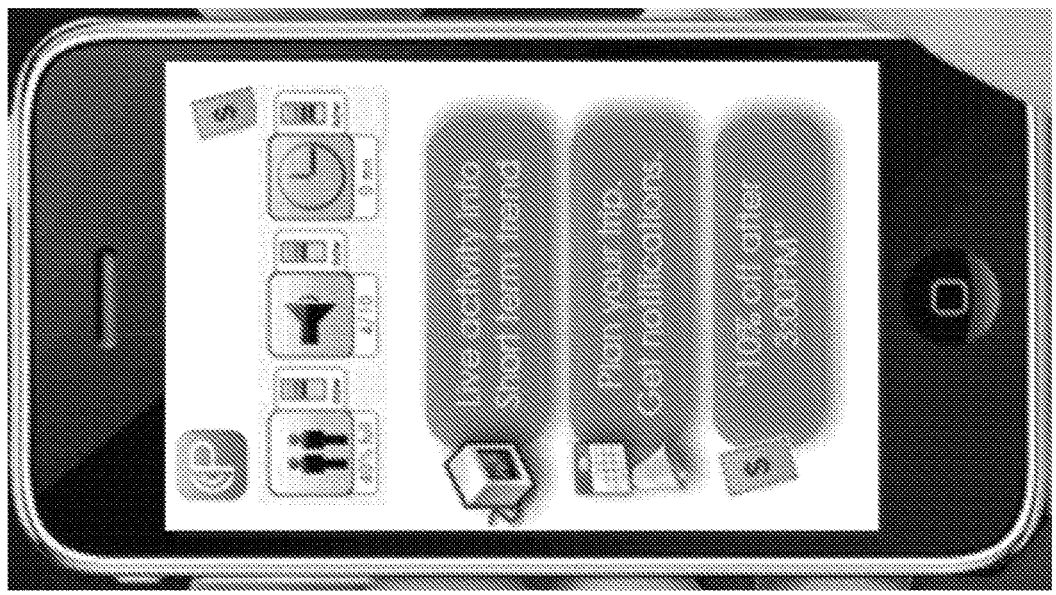
Figure 5:
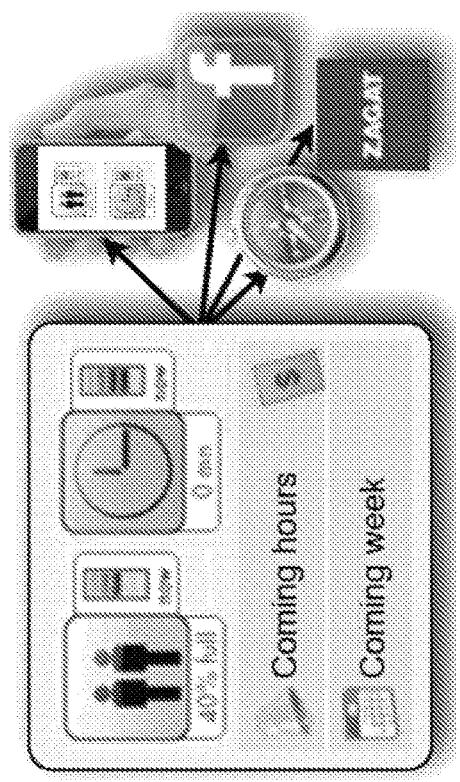

Some embodiments of the PM-PLATFORM may use historical data/past example to predict how a PM metric will be in the future. For instance, the PM PLATFORM may determine a predicted measure for a given (future) day and/or time, the PM-PLATFORM can utilize data on how this (and/or a similar) measure was at the same time and same day of the week in the past, and can estimate, over past examples, biases due to the temperature, the amount of rain or snow, etc., on the same day of the week and hour. The PM-PLATFORM can estimate another bias if a recurring local event occurred in the past (e.g., school dismissal, church event, etc.). The PM-PLATFORM may then apply these biases to the originally predicted measure to refine the prediction. A weekly or daily planner may then be created by representing, for each day and hour or groups of 2 to 4 hours, the predicted value using its color code as determined above. Users can choose the interval and granularity of this representation. FIG. 4 provides an example representation of PM-PLATFORM data provided to users. Depending on the implementation, the color codes, logos, weekly or daily planners, may all or variously be integrated into a portable graphic element (e.g., HTML code) that can be displayed on website, social network pages, mobile applications, and/or the like. Consumers may then use this data and widgets to choose when to visit the place and optimize the quality of their experience by waiting less or having a place that is more or less active depending on what they are looking for. Users can also choose to go to a different branch of the same company (e.g., hospital emergency rooms, chain stores, etc.) or institution if it is less crowded there or more like what they like (e.g., if they like busy clubs/bars). FIG. 5 illustrates additional interface/display elements for some implementations of the PM-PLATFORM.

In some embodiments of the PM-PLATFORM, the measures and predictions may be represented in a much more complex, granular and complete way to business owners so they can have insights on how their business is active in general, how the weather impacts their traffic, how local events impact their traffic. Using their sales data, the PM-PLATFORM may also compute how traffic, wait time, and other PM metrics impacts sales.

As discussed above, various sensors communicate with the PM PLATFORM backend, and the PM-PLATFORM backend may control such sensors. Embodiments of the PM-PLATFORM provide and/or facilitate appropriate communication infrastructure, and the following details provide non-limiting examples for some implementations, in particular example APIs used by devices to communicate with the PM-PLATFORM backend, and by the PM-PLATFORM backend to communicate back to the devices. In one implementation, the API is a REST API with data encoded as JSON string to string maps as an output, and no object or class is used.

Devices may report the PM metrics to the PM-PLATFORM backend, as well as their activity reports, error logs hardware status messages, etc., and when specified, debug data. The PM-PLATFORM may communicate back to devices to update their software, change their configuration, like debug level, log level, algo parameters, etc. The "control" API may be utilized, but in some embodiments may be initiated by the devices as the server may be unable to reach devices individually, e.g., if they are on a cell carrier's private network.

In some embodiments, the API is thus separated in two zones: report and control. Exemplary samples are provided below.

Services running on a sensor machine may include logging daemons that may send report queries on a regular basis. The frequency may, in some embodiments, be defined in a sensor configuration file. In some embodiments, large files (e.g., video debugs) may be submitted to the backend through an ftp server. The ftp server configuration may be set in a sensor configuration file. The daemons may include, by way of non-limiting example:

pm sample Demon—this demon will report all the content of the sensor's measuring events database to the PM-PLATFORM backend, clearing up the local database when the data is reported.

pmLogDaemon—a trigger in a mongo database or a service may send logs as they appear in a sensor sqlite database. It may not clean the error log file but may clean the database. Default log level may be a warning so only warning and errors will be reported, while if another level is set, more logs may be sent. These logs may not include files.

pmSystemLogDaemon—this daemon may send regular log and error files to the server, as well as a status of the system including RAM, CPU activity, disk space, processes running. Logs may be sent on a frequency defined by configuration, typically not very high, depending on the implementation, e.g., every hour or twice a day. Some embodiments may use the ftp channel.

pmVideoLogDaemon—when logging videos, the sensor may save video files of a given length into a given folder. When a file is complete, an entry may be logged into the local sensor database. This daemon may scan this file logging table and send any file that appears, then delete it.

Control daemons may facilitate remote administration tasks of the PM PLATFORM performed on sensor machines. Heavy administration may be performed locally, e.g., using USB keyword/mouse and USB portable screens, plugged into a USB output visible on the box, or network connection in Wi-Fi if available on the sensor, through the Ethernet port, and/or the like.

SSH may be running on the sensor. Remote administration functions include: (a) admin/command/software update (e.g., send the box a URL to download and install the new version); (b) admin/getconfig—get the configuration file or just one configuration; (c) admin/command/execute a command—the command can be, for example: reboot system, restart software and services, flush temp files, execute script command as PM-PLATFORM user, get or set config-debug mode, video/audio debug mode, daemon frequencies, etc., and/or force update—to check for updates now; (d) admin/command/output post the output of a command.

To execute these commands, a crontab based daemon (e.g., pmCommandDaemon), may ping an "admin/command/execute" URL at an interval determined by a config file. Another daemon to check for updates may run on a lower frequency (e.g., pmSoftwareUpdateDaemon).

In some embodiments of the PM-PLATFORM, when a command is finished locally, the results will be sent to an "admin/command/output" URL. Each command may have a unique ID for each terminal. In some implementations, only one command may be sent at a time, and/or all commands may be taken from the database. Once a command is sent, its status may be changed. Once it has completed, its status is changed again and the output stored in the database.

In some embodiments, while in debug mode, the frequency of the command daemon will be set to 5 seconds. In regular times, it will be one hour.

The following example process illustrates sensor and place setup for some embodiments of the PM-PLATFORM (i.e., when a new place is being installed). Each sensor may have a unique ID that is tied to its hardware. In one implementation, it may be the MAC address of a local Ethernet card. The sensor may also have a configuration file where the type, the version and a short description of the sensor can be entered. A command on the sensor (e.g., pmRegisterSensor) may be used to register the sensor on the PM-PLATFORM backend. This command may send a query to the admin/register API and create a sensor in the database. In some embodiments, this can only happen once, as the command may fail if a sensor with the same ID already exists in the PM PLATFORM backend. New places may be created on the PM-PLATFORM backend. Sensors and places are connected on the PM-PLATFORM backend server. A page may list all "orphan" sensors, e.g. sensors that are not linked to a place. For each sensor, admin users can select a place and link it to the sensor.

Some implementations of the PM-PLATFORM may utilize an FTP channel, to facilitate transmission of larger files like videos or logs, while in some implementations files are reported through HTTP POST queries. Each time an FTP channel is used, a report/ftp query may be made to notify the PM-PLATFORM backend. Files may be uploaded to a folder (e.g., named [placeID]/incoming). Once the file is processed, it may be removed. A regular flushing may be performed to remove old files. In some instances, the file name will be defined by the client. The client may be responsible to not upload files with the same names.

The PM-PLATFORM may utilize various input and output formats, and the PM-PLATFORM backend API may accept both POST and GET queries with arguments encoded into the URL or as multipart form-data. The return format may be an array of JSON encoded string to string. If the return array is empty it means the query completed successfully. Errors may be encoded as elegant maps containing the following values:

| | |
|---|---|
| error_code | The error code. This is not an integer but a string. |
| error_message | The description of the error if any. |

Some embodiments of the PM-PLATFORM may utilize a report API so that devices that need to report information to a server, be it PM-PLATFORM sample data or logs from the software or the system, may utilize the appropriate API. This method may be used when reporting PM-PLATFORM data samples. Each sample may be linked to a sensor with a unique ID, has a type, a time and a value. In some embodiments, sensors must be created in the database for the request to be accepted, and they may have to be linked to a location as some sensors may depend on other sensors in the same location to compute the right measure. The following is example input:

| Name | Type | Typical or allowed value | Description |
|---|---|---|---|
| sensor_id | string | 64 char ID. | Unique ID describing the device or sensor reporting the data. The device's MAC address can be used if available. |
| Date | ulong | Epoch | Seconds since 1970, GMT |
| Type | string | traffic, soundlevel; lightlevel, | The type of measure sent. Has to be registered type. Should be known type or error will be returned. |
| Value | string | N/A | The value of the measure. Its type or typical or accepted values depends on the type of measure. |

In some embodiments, nothing is returned if all goes well, while an error is returned if not. Errors may be logged in the database. The following is an illustrative, non-limiting list of example errors:

MISSING_PARAMETER: one of the mandatory parameters is missing.

BAD_PARAMETER: one of the parameters has the wrong format.

MEASURE_TYPE_UNKNOWN: the measure type is not registered.

SENSOR_NOT_FOUND: sensors must be registered in the database for the query to succeed.

NO_PLACE_FOR_SENSOR_FOUND: sensors must be linked to a place in the database to work.

Embodiments of the PM-PLATFORM may utilize report/log features. Such features may be used when a log is found on the sensor and needs to be reported. Once reported the log is removed from the database but not from the log files. This example API may be used to report log files also, while in some implementations, the FTP channel may be used to transfer files and a new type of log may be available, a file log where the file is already on the server.

The following provides exemplary input for some embodiments of the PM PLATFORM.

| Name | Type | Typical or allowed value | Description |
|---|---|---|---|
| sensor_id | string | 64 char ID | Unique ID describing the device or sensor reporting the data. The device's MAC address can be used if available. |
| Date | ulong | Epoch | Seconds since 1970. |
| Message | string | Human readable | A human readable log message (optional). |
| Code | string | "FILE_NOT_FOUND", . . . | A string error code that represents the error type if it is an error. |
| Level | int | 0 = DEBUG 1 = INFO 2 = WARNING 3 = ERROR | The log level. |
| File name | string | Filename | The name of the file that was sent (optional). |

For such elements, nothing is returned, and the following errors may be applicable:

SENSOR_NOT_FOUND: sensors must be registered in the database for the query to succeed.

MISSING_PARAMETER: one of the mandatory parameters is missing

BAD_PARAMETER: one of the parameter has the wrong format

In some embodiments of the PM-PLATFORM, an admin API is generally used to administer and control sensors remotely—administrators enter commands to send to each sensors in the database, each sensor pings the "api/admin/command" URL on a regular basis to get the next command, and this URL takes a sensor ID, a command type, a name and value for the arguments. When the command is completed, the sensors pings the "api/admin/completed" URL with the results. The following exemplary admin/command input:

| Name | Type | Typical or allowed value | Description |
|---|---|---|---|
| sensor_id | string | 64 char ID. | Unique ID describing the device or sensor reporting the data. The device's MAC address can be used if available. |

In some implementations, a JSON object is returned as a dictionary with the following keys:

| Name | Type | Typical or allowed value | Description |
|---|---|---|---|
| id | string | | The ID of the command-used to report the result. |
| command | string | See below | The control to run |
| args | string | | A dict representing the arguments. |

In some implementations, each command has a type listed below, where the name of the arguments is given in parenthesis:

shell(command_line)—executes the give command line and will return the output as a result reset( ), reboot( )—resets the software or reboot the sensor set_config(param_name, param_value)—sets a config parameter get_config(param_name)—gets a config parameter, gets all parameters in a string if no parameter is specified tunnel_start(port)/tunnel_stop/tunnel_check—start, stop or check VNC server In some embodiments, admin/completed is called to report the result of a command. The input is as below, while the return is nothing unless there is a problem (in which case an error object is returned).

| Name | Type | Typical or allowed value | Description |
|---|---|---|---|
| command_id | string | 64 char ID. | The ID of the command |
| output | string | | The output of the command (optional) |
| date | ulong | Epoch | Seconds since 1970. |
| success | bool | 0/1 | Failure or success! |

In some embodiments of the PM-PLATFORM, admin/ register element is called to register a sensor into the PM-PLATFORM backend. This command returns an error if a sensor with the same ID already exists in the database. If not, it will create the sensor object into the PM-PLATFORM backend, and it may then be tied to a place (e.g., dynamically or by an admin user). The input is as below, while the return is nothing unless there is a problem (in which case an error object is returned).

| Name | Type | Typical or allowed value | Description |
|---|---|---|---|
| sensor_id | string | 64 char ID. | Unique ID describing the device or sensor reporting the data. The device's MAC address can be used if available. |
| name | string | [type] | The human readable name of the string. |
| type | string | [type] | The type of sensor. |
| desc | string | Lost string | A short description of the sensor |
| [ . . . ] | string | . . . | Other parameters that describe the sensor . . . |

APPENDIX A provides additional details according to some embodiments of the PM-PLATFORM.

PM-Platform Controller

Figure 6:
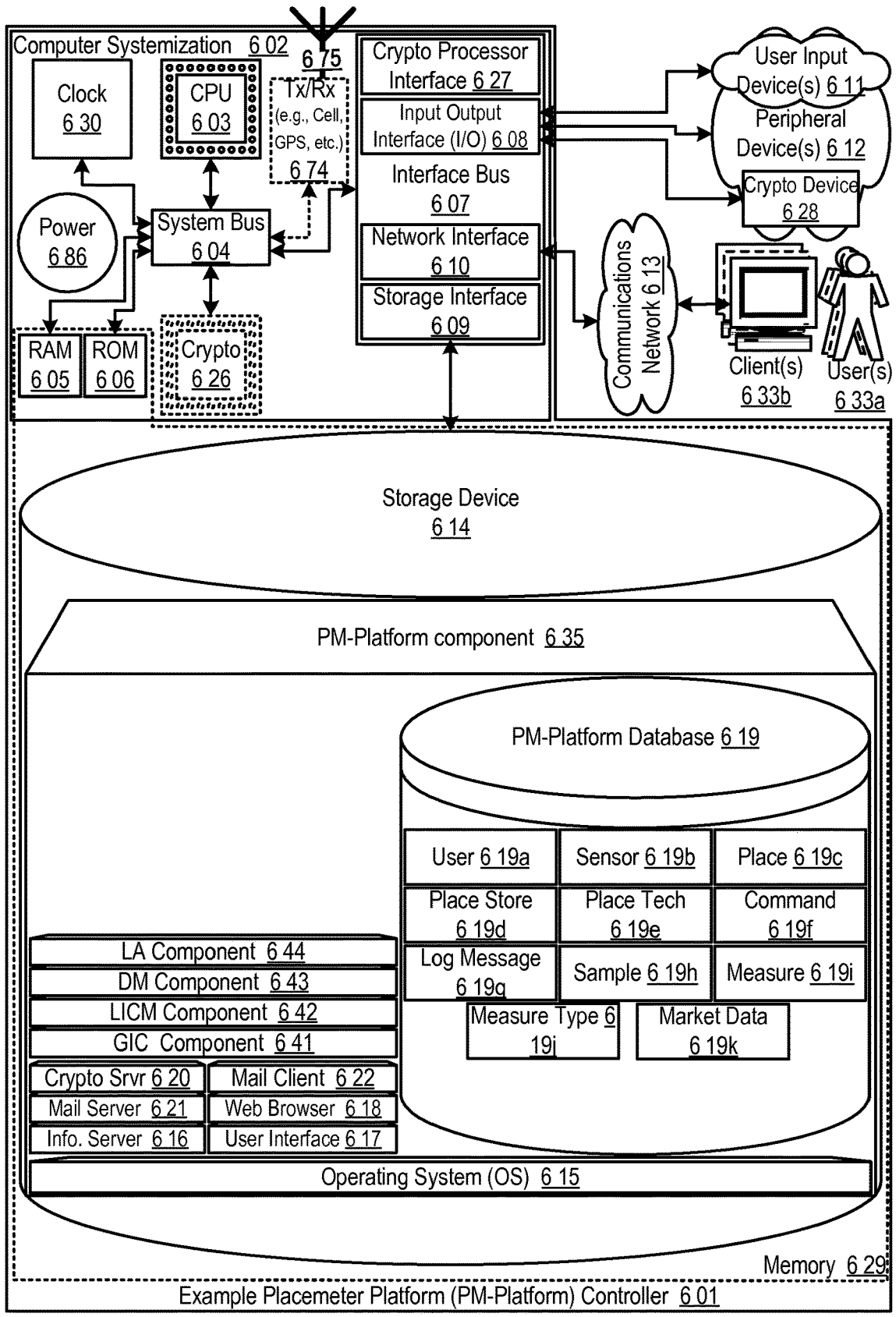
FIG. 6 shows a block diagram illustrating embodiments of a PM PLATFORM controller.

FIG. 6 shows a block diagram illustrating embodiments of a PM PLATFORM controller 601. In this embodiment, the PM-PLATFORM controller 601 may serve to aggregate, process, store, search, serve, identify, instruct, generate, match, and/or facilitate interactions with a computer through various technologies, and/or other related data.

Typically, users. e.g., 633a, which may be people and/or other systems, may engage information technology systems (e.g., computers) to facilitate information processing. In turn, computers employ processors to process information; such processors 603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer, memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the PM-PLATFORM controller 601 may be connected to and/or communicate with entities such as, but not limited to: one or more users from user input devices 611; peripheral devices 612; an optional cryptographic processor device 628; and/or a communications network 613. For example, the PM-PLATFORM controller 601 may be connected to and/or communicate with users, e.g., 633a, operating client device(s), e.g., 633b, including, but not limited to, personal computer(s), server(s) and/or various mobile device(s) including, but not limited to, cellular telephone(s), smartphone(s) (e.g., iPhone@, Blackberry@, Android OS-based phones etc.), tablet computer(s) (e.g., Apple iPad™, HP Slate™, Motorola Xoomm™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo@ DS, Sony PlayStation@ Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user IS commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks. Wide Area Networks (WANs), Wireless Networks (WLANs), etc. For example, the Internet is generally accepted as being an interconnection of a multitude of networks whereby remote clients and servers may access and interoperate with one another.

The PM-PLATFORM controller 601 may be based on computer systems that may comprise, but are not limited to, components such as: a computer systemization 602 connected to memory 629.

Computer Systemization

A computer systemization 602 may comprise a clock 630, central processing unit ("CPU(s)" and/or "processor(s)" (these terms are used interchangeably throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effectuate communications, operations, storage, etc. The computer systemization may be connected to a power source 686; e.g., optionally the power source may be internal. Optionally, a cryptographic processor 626 and/or transceivers (e.g., ICs) 674 may be connected to the system bus. In another embodiment, the cryptographic processor 626 and/or the transceivers 674 may be connected as either internal and/or external peripheral devices 612 via the interface bus I/O. In turn, the transceivers 674 may be connected to antenna(s) 675, thereby effectuating wireless transmission and reception of various communication and/or sensor protocols; for example the antenna(s) may connect to: a Texas Instruments 21 Wi Link WL1283 transceiver chip (e.g., providing 802.11n, Bluetooth 3.0, FM, global positioning system (GPS) (thereby allowing PM-PLATFORM controller to determine its location)); Broadcom BCM4329FKUBG transceiver chip (e.g., providing 802.11n, Bluetooth 2.1+ EDR. FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management 22 control units, floating point units, and even specialized processing sub-units like graphics processing units, digital signal processing units, and/or the like. Additionally, processors may include internal fast access addressable memory, and be capable of mapping and addressing memory 629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the PM-PLATFORM controller and beyond through various interfaces. Should processing requirements dictate a greater amount speed and/or capacity, distributed processors (e.g., Distributed PM-PLATFORM), mainframe, multi core, parallel, and/or super-computer architectures may similarly be employed. Alternatively, should deployment requirements dictate greater portability, smaller Personal Digital Assistants (PDAs) may be employed.

Depending on the particular implementation, features of the PM PLATFORM may be achieved by implementing a micro controller such as CAST's R8051XC2 microcontroller; Intel's MCS 51 (i.e., 8051 microcontroller); and/or the like. Also, to implement certain features of the PM-PLATFORM, some feature implementations may rely on embedded components, such as: Application-Specific Integrated Circuit ("ASIC"). Digital Signal Processing ("DSP"), Field Programmable Gate Array ("FPGA"), and/or the like embedded technology. For example, any of the PM-PLATFORM component collection (distributed or otherwise) and/or features may be implemented via the microprocessor and/or via embedded components; e.g., via ASIC, coprocessor. DSP, FPGA, and/or the like. Alternately, some implementations of the PM-PLATFORM may be implemented with embedded components that are configured and used to achieve a variety of features or signal processing.

Depending on the particular implementation, the embedded components may include software solutions, hardware solutions, and/or some combination of both hardware/software solutions. For example, PM-PLATFORM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the PM-PLATFORM features. A hierarchy of programmable interconnects allow logic blocks to be interconnected as needed by the PM-PLATFORM system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the PM-PLATFORM may be developed on regular FPGAs and then migrated into a fixed version that more resembles ASIC implementations. Alternate or coordinating implementations may migrate PM-PLATFORM controller features to a final ASIC instead of or in addition to FPGAs. Depending on the implementation all of the aforementioned embedded components and microprocessors may be considered the "CPU" and/or "processor" for the PM-PLATFORM.

Power Source

The power source 686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the PM-PLATFORM thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(es) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the PM PLATFORM controller is accessible through remote clients 633*b* (e.g., computers with web browsers) by users 633*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PM-PLATFORM), architectures may similarly be employed to pool, load balance, and/or otherwise increase the communicative bandwidth required by the PM-PLATFORM controller. A communications network may be anyone and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 611 often are a type of peripheral device 612 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 612 may be connected and/or communicate to I/O and/or other facilities of the like such as network interfaces, storage interfaces, directly to the interface bus, system bus, the CPU, and/or the like. Peripheral devices may be external, internal and/or part of the PM-PLATFORM controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 628), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the PM-PLATFORM controller may be embodied as an embedded, dedicated, and/or monitor-less (i.e., headless) device, wherein access would be provided over a network interface connection.

Cryptographic units such as, but not limited to, micro controllers, processors 626, interfaces 627, and/or devices 628 may be attached, and/or communicate with the PM-PLATFORM controller. A MC68HC16 micro controller, manufactured by Motorola Inc., may be used for and/or within cryptographic units. The MC68HC16 micro controller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous 17 transactions. Cryptographic units may also be configured as part of the CPU. Equivalent micro controllers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the PM-PLATFORM controller and/or a computer systemization may employ various forms of memory 629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 629 may contain a collection of program and/or database components and/or data such as, but not limited to: operating system component(s) 615 (operating system); information server component(s) 616 (information server); user interface component(s) 617 (user interface); Web browser component(s) 618 (Web browser); database(s) 619; mail server component(s) 621; mail client component(s) 622; cryptographic server component(s) 620 (cryptographic server); the PM-PLATFORM component(s) 635; and/or the like (i.e., collectively a component collection). These components may be stored and accessed from the storage devices and/or from storage devices accessible through an interface bus. Although non-conventional program components such as those in the component collection, typically, are stored in a local storage device 614, they may also be loaded and/or stored in memory such as: peripheral devices, RAM, remote storage facilities through a communications network, ROM, various forms of memory, and/or the like.

Operating System

The operating system component 615 IS an executable program component facilitating the operation of the PM-PLATFORM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; BeOS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2. Microsoft DOS, Microsoft Windows 2000/2003/3.1/95/98/CE/Millenium/NT/Vista/XP (Server). Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the PM-PLATFORM controller to communicate with other entities through a communications network 613. Various communication protocols may be used by the PM-PLATFORM controller as a sub carrier transport mechanism for interaction, such as, but not limited to: multicast, TCP/IP, UDP, unicast, and/or the like.

Information Server

An information server component 616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++). C# and/or .NET, Common Gateway Interface (CGI) scripts, dynamic (D) hypertext markup language (HTML), FLASH, Java, JavaScript. Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM). Application Exchange (APEX), ICQ, Internet Relay Chat (IRC), Microsoft Network (MSN) Messenger Service. Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the PM-PLATFORM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the PM-PLATFORM database 619, operating systems, other program components, user interfaces, Web browsers, and/or the like.

Access to the PM-PLATFORM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the PM-PLATFORM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the PM-PLATFORM as a query. Upon generating query results from the query, the results are passed over the bridge mechanism, and may be parsed for formatting and generation of a new results. Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XPVista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX. AJAX, (D)HTML, FLASH, Java. JavaScript, etc. interface libraries such as, but not limited to, Dojo, jQuery(UI). MooTools. Prototype, script.aculo.us, SWFObject, Yahoo! User Interface, any of which may be used and) provide a baseline and means of accessing and displaying information graphically to users.

A user interface component 617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 618 is a stored program component that is executed by a cpu. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH. Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses.

Also, in place of a Web browser and information server, a combined application may be developed to perform similar operations of both. The combined application would similarly affect the obtaining and the provision of information to users, user agents, and/or the like from the PM-PLATFORM enabled nodes. The combined application may be nugatory on systems employing standard Web browsers.

Mail Server

A mail server component 621 is a stored program component that is executed by a CPU 603. The mail server may be a conventional Internet mail server such as, but not limited to sendmail, Microsoft Exchange, and/or the like. The mail server may allow for the execution of program components through facilities such as ASP. ActiveX, (ANSI) (Objective-) C (++), C# and/or .NET, CGI scripts. Java. JavaScript. PERL, PHP, pipes. Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the PM PLATFORM.

Access to the PM-PLATFORM mail may be achieved through a number of APIs offered by the individual Web server components and/or the operating system.

Also, a mail server may contain, communicate, generate, obtain, and/or 2 provide program component, system, user, and/or data communications, requests. 3 information, and/or responses.

Mail Client

A mail client component 622 is a stored program component that is executed by a CPU 603. The mail client may be a conventional mail viewing application such as Apple Mail. Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 620 is a stored program component that is executed by a CPU 603, cryptographic processor 626, cryptographic processor interface 627, cryptographic processor device 628, and/or the like. Cryptographic processor interfaces will allow for expedition of encryption and/or decryption requests by the cryptographic component; however, the cryptographic component, alternatively, may run on a conventional cpu. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum. Data Encryption Standard (DES). Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the PM-PLATFORM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the PM-PLATFORM component to engage in secure transactions if so desired. The cryptographic component facilitates the secure accessing of resources on the PM PLATFORM and facilitates the access of secured resources on remote systems; i.e., it may act as a client and/or server of secured resources. Most frequently, the cryptographic component communicates with information servers, operating systems, other program components, and/or the like. The cryptographic component may contain. 8 communicate, generate, obtain, and/or provide program component, system, user, and/or data communications, requests, and/or responses.

The PM-PLATFORM Database

The PM-PLATFORM database component 619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the PM-PLATFORM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the PM-PLATFORM database is implemented as a data-structure, the use of the PM-PLATFORM database 619 may be integrated into another component such as the PM-PLATFORM component 635. Also, the database may be implemented as a mix of data structures, objects, and relational structures. Databases may be consolidated and/or distributed in countless variation through standard data processing techniques. Portions of databases, e.g., tables, may be exported and/or imported and thus decentralized and/or integrated.

In one embodiment, the database component 619 includes several tables 619*a-k*. A Users table 619*a* may include fields such as, but not limited to: user_id, security, first_name, last_name, age, state, address_firstline, address_secondline, zipcode, devices_list, contact_info, contact_type, alt_contact_info, alt_contact_type, provider, and/or the like.

A Sensor table 619*b* may include fields such as, but not limited to: sensor_ID, type, create_date, place_ID, status, and/or the like.

A Place table 619*c* may include fields such as, but not limited to: place_ID, name, location, city, ZIP, address, address2, state, country, place_create_date, place_status, and/or the like.

A Place Store Info table 619*d* may include fields such as, but not limited to: place_store_ID, type, employee_number, place_ID, open, close, day, status, and/or the like.

A Place Tech Info table 61*ge* may include fields such as, but not limited to: place_tech_ID, type, wifi, wifi_pw, place_ID, dongleID, status, and/or the like.

A Command table 619*f* may include fields such as, but not limited to: command_ID, type, value, status, output, senor_ID, and/or the like.

A Log Message table 619*g* may include fields such as, but not limited to: 10 g_ID, type, severity, type2, message, date, place_ID, sensor_ID, status, and/or the like.

A Sample table 619*h* may include fields such as, but not limited to: sample_ID, sensor_ID, place_ID, measure_type, value, time, status, and/or the like.

A Measure table 619*i* may include fields such as, but not limited to: measure_ID, place_ID, timesensor_ID, place_ID, measure_type_ID, value, time, status, and/or the like.

A Measure Type table 619*j* may include fields such as, but not limited to: measure_type_ID, description, name, and/or the like.

A Market Data table 619*k* may include fields such as, but not limited to: market_data_feed_ID, asset_ID, asset_symbol, asset_name, price, and/or the like; in one embodiment, the market data table is populated through a market data feed (e.g., Bloomberg's PhatPipe, Dun & Bradstreet, Reuter's Tib, Tri arch, etc.), for example, through Microsoft's Active Template Library and Dealing Object Technology's real-time toolkit Rtt.Multi.

In one embodiment, the PM-PLATFORM database may interact with other database systems. For example, employing a distributed database system, queries and data access by search PM-PLATFORM component may treat the combination of the PM-PLATFORM database, an integrated data security layer database as a single database entity.

In one embodiment, user programs may contain various user interface primitives, which may serve to update the PM-PLATFORM. Also, various accounts may require custom database tables depending upon the environments and the types of clients the PM-PLATFORM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 619*a-k*. The PM-PLATFORM may be configured to keep track of various settings, inputs, and parameters via database controllers.

The PM-PLATFORM database may communicate to and/or with other 23 components in a component collection, including itself, and/or facilities of the like. Most frequently, the PM-PLATFORM database communicates with the PM-PLATFORM component, other program components, and/or the like. The database may contain, retain, and provide information regarding other nodes and data.

The PM-PLATFORMs

The PM-PLATFORM component 635 is a stored program component that is executed by a cpu. In one embodiment, the PM-PLATFORM component incorporates any and/or all combinations of the aspects of the PM-PLATFORM discussed in the previous figures. As such, the PM-PLATFORM affects accessing, obtaining and the provision of information, services, transactions, and/or the like across various communications networks.

The PM-PLATFORM component may transform sensor data and/or feedback via PM-PLATFORM components into notifications, updates, coupons, promotions, transactions and/or activities, and/or the like and use of the PM-PLATFORM. In one embodiment, the PM-PLATFORM component 635 takes inputs (e.g., raw sensor data, and/or the like) etc., and transforms the inputs via various components (e.g., GIC 641; LICM 642; DM 643; LA 644; and/or the like), into outputs (e.g., PM metrics, notifications, updates, coupons, promotions, transactions and/or activities, and/or the like).

The PM-PLATFORM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java. JavaScript, mapping tools, procedural and object oriented development tools. PERL, PHP. Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects. and/or the like. In one embodiment, the PM-PLATFORM server employs a cryptographic server to encrypt and decrypt communications. The PM-PLATFORM component may communicate to and/or with other components in a component collection, including itself, and/or facilities of the like.

Most frequently, the PM-PLATFORM component communicates with the PM-PLATFORM database, operating systems, other program components, and/or the like. The PM-PLATFORM may contain, communicate, generate, obtain, and/or provide program component, system, user, and/or data communications, requests, and/or responses.

Distributed PM-PLATFORMs

The structure and/or operation of any of the PM-PLATFORM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of anyone of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the PM-PLATFORM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI). SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

15 w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the PM-PLATFORM controller may be executing a PHP script implementing a Secure Sockets Layer ("SSL") socket server via the information server, which listens to incoming communications on a server port to which a client may send data. e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSONencoded input data from a client device via a SSL connection, parse the data to extract variables, and store the data to a database, is provided below:

```
<?PHP
header ('Content-Type: text/plain');
// set ip address and port to listen to for incoming data
$address = '192.168.0.100';
$port = 255;
// create a server-side SSL socket, listen for/accept incoming
communication
$sock = socket _create (AF_INET, SOCK STREAM, 0);
socket_bind ($sock, $address, $port) or die ('Could not bind to address');
socket_listen ($sock);
$client = socket accept ($sock);
// read input data from client device in 1024 byte blocks until end of
message
do {
        $input " ";
        $input = socket_ read ($client, 1024);
        $data= $input;
} while ($input != "");
// parse data to extract variables
$obj = json _decode ($data, true);
// store input data in a database
mysql _connect ("201.408.185.132",$DBserver,$password);
//access database server
mysql _select ("CLIENT DB.SQL"); // select database to append
mysql _query ("INSERT INTO UserTable (transmission)
```

-continued

```
VALUES ($data)"); // add data to UserTable table in a CLIENT database
mysql_close ("CLIENT DB.SQL"); // close connection to database
?>
```

Also, the following resources may be used to provide example embodiments regarding SOAP parser implementation:
http://www.xav.com/perl/site/lib/SOAP/Parser.html
http://publib.boulder.ibm.com/infocenter/tivihelp/
v2rllindex.jsp?topic-/com.ibm .IBMDI.doc/referenceguide295.htm
and other parser implementations:
http://publib.boulder.ibm.com/infocenter/tivihelp/
v2rllindex.jsp?topic=/com.ibm .IBMDI.doc/referenceguide259.htm
all of which are hereby expressly incorporated by reference herein.

In order to address various issues and advance the art, the entirety of this application for PLACEMETER PLATFORM APPARATUSES, METHODS AND SYSTEMS (including the Cover Page, Title, Headings, Field. Background. Summary, Brief Description of the Drawings. Detailed Description, Claims, Abstract. Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a PM-PLATFORM individual and/or enterprise user, database configuration and/or relational model, data type, data transmission and/or network framework, syntax structure, and/or the like, various embodiments of the PM-PLATFORM may be implemented that enable a great deal of flexibility and customization. While various embodiments and discussions of the PM PLATFORM have been directed to activity measurement, however, it is to be understood that the embodiments described herein may be readily configured and/or customized for a wide variety of other applications and/or implementations.

The invention claimed is:

1. A system for analyzing electronic signal data, the system comprising:
 a processor receiving raw signal data from a plurality of sensors in an environment at different points in time, wherein a first sensor selected from the plurality of sensors is configured to generate a video stream and a second sensor selected from the plurality of sensors is configured to detect environmental data;
 the processor analyzing the raw signal data received at each of the different points in time wherein the raw signal data comprises object trajectories;
 the processor generating a plurality of metrics derived from the raw signal data for each of the different points in time, wherein the plurality of metrics comprise a time at which an object trajectory crosses a predefined threshold;
 the processor analyzing the plurality of metrics to determine changes in the environment over time;
 the processor storing the plurality of metrics and a time stamp corresponding to each of the plurality of metrics in a database, the database stored in a storage device in communication with the processor;
 the processor determining at least one predicted metric in the environment over time as a function of the plurality of metrics and the corresponding time stamp stored in the database; and
 the processor generating an end user view that graphically illustrates,
  the changes in the environment over time, wherein the changes comprise historical information regarding the changes in the environment over time and the at least one predicted metric in the environment over time.

2. The system of claim 1, wherein:
 the first sensor is a camera configured to generate one or more video streams; and
 the second sensor is an infrared diode or camera configured to generate raw signal data corresponding to infrared data.

3. The system of claim 2, wherein:
 the second sensor includes a plurality of sensors, and
 each of the plurality of sensors is arranged with an overlapping detection region or field of view to encompass the environment.

4. The system of claim 1, wherein the raw signal data comprises one or more video streams, and wherein the processor analyzing the plurality of metrics to determine changes in the environment over time comprises comparing similar metrics from two images of a same scene from two different points in time.

5. The system of claim 4, wherein the similar metrics comprises gray levels.

6. The system of claim 5, wherein the processor analyzing the plurality of metrics to determine changes in the environment over time further comprises estimating a gray level probability density function for each of the two images.

7. The system of claim 5, wherein the processor analyzing the plurality of metrics to determine changes in the environment over time further comprises using the probability density functions of the two images to generate a measure of normalized mutual information.

8. The system of claim 7, wherein the processor analyzing the plurality of metrics to determine changes in the environment over time further comprises computing multiple difference maps over a sequence of images captured over time.

9. The system of claim 4, wherein the processor analyzing the plurality of metrics to determine changes in the environment over time further comprises comparing similar metrics sequentially over a succession of images captured over time, and further comprises selecting an image as a background image.

10. The system of claim 9, wherein the method further comprises determining a mask.

11. The system of claim 10, wherein the mask is determined as a difference map between a current image and a current background image.

12. The system of claim 11, wherein the method further comprises:
the processor determining subsequent masks for subsequent images; and
the processor storing a list of current object tracks, wherein object tracks comprise consecutive masks representing a same object that moves in a video.

13. The system of claim 12, wherein the method further comprises:
the processor splitting a newly created mask into connected components;
the processor comparing each connected component to existing objects; and
the processor associating a current connected component with the object that best matches it.

14. The system of claim 13, wherein the method further comprises archiving an object when the object has not been associated with a connected component of a mask for a predetermined period, wherein a trajectory of an archived object represents the trajectory of the object through an image over time.

15. The system of claim 14, wherein the method further comprises the processor analyzing multiple archived object trajectories to determine what the archived object trajectories represent.

16. The system of claim 15, wherein the analysis of archived object trajectories yields one or more of the plurality of metrics.

17. The system of claim 1, wherein the method further comprises storing data regarding origination of each of the plurality of metrics in the database.

18. The system of claim 17 further comprising the processor adjusting at least one of the plurality of metrics as a function of the corresponding data regarding origination of the metric.

19. The system of claim 1 wherein the processor stores the plurality of metrics and the time stamp on a first day and the processor determines the at least one predicted metric on a second day, wherein the second day is different than the first day.

20. The system of claim 1 further comprising:
a user input device;
the processor receiving input from the user input device corresponding to a desired interval and granularity of the at least one predicted metric; and
the end user view illustrates the at least one predicted metric corresponding to the desired interval and granularity.

* * * * *